May 20, 1930.   C. Y. KNIGHT   1,759,510
PISTON FOR MOTORS
Filed April 30, 1919
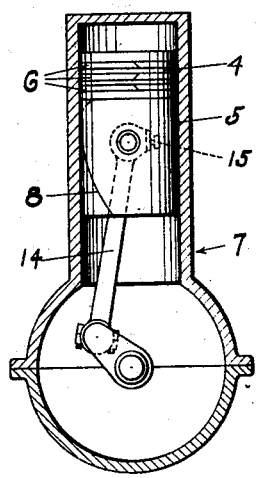
Fig. I.
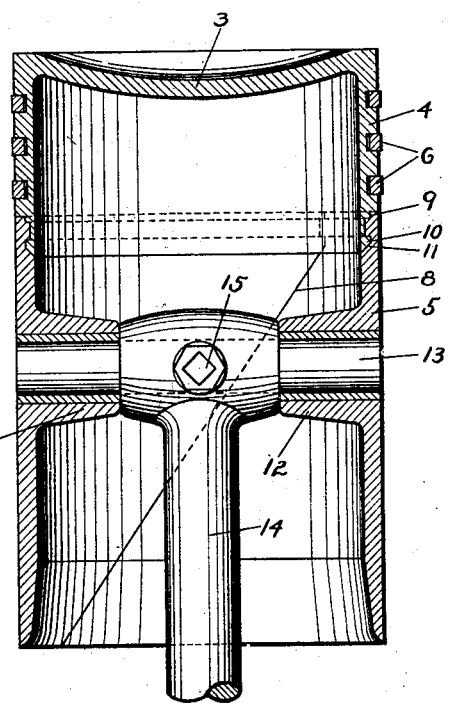
Fig. II.
INVENTOR.
Charles Y. Knight
BY *Wynn H. Gordon*
ATTORNEY Patented May 20, 1930

1,759,510

UNITED STATES PATENT OFFICE

CHARLES Y. KNIGHT, OF PASADENA, CALIFORNIA, ASSIGNOR TO THE KNIGHT AMERICAN PATENTS COMPANY, OF CHICAGO, ILLINOIS, A CORPORATION OF DELAWARE

PISTON FOR MOTORS

Application filed April 30, 1919. Serial No. 293,650.

This invention relates to pistons for motors, and more particularly to internal combustion motors in which the piston is subjected to high temperatures and undergoes a considerable degree of expansion, rendering it necessary or desirable to make the body of the piston materially smaller than the bore of the cylinder. In motors or engines of this type, the piston employed is usually the trunk form of piston consisting of two parts which might be termed the head and the trunk, although ordinarily these parts are cast in one piece. Being desirably made of cast iron, it is important that the head portion, which is grooved for the reception of the piston rings, and which receives the direct shock of the explosion, shall be heavier than the remaining or trunk portion, which ordinarily is attenuated as much as possible for the sake of lightness. A piston thus constituted of a body of cast iron or other metal much heavier at one end than at the other, expands unequally when heated, the heavier portion being the head portion, which is subjected to the direct action of the explosion, undergoes the greater degree of expansion, and owing to the irregularities or lack of uniformity in the thickness of the metal, it warps or distorts the piston as a whole and results in a tendency of the piston to bind in the bore of the cylinder.

Furthermore, trunk pistons or those forms of pistons which have a plain portion projecting any considerable distance below or beyond the piston rings produce a knocking sound as a result of the play between the trunk or such extension and the wall of the cylinder, it being understood that when the explosion occurs with the connecting rod at an angle to the axis of the piston, the piston is always forced in the direction in which the upper or driving end of the connecting rod inclines.

This invention is designed to obviate the objections hereinbefore noted, as well as certain other objections to the prior art, which will hereafter appear in the study and use of this invention, and the invention therefore has for one of its important objects, to so construct the piston that the head or end which carries the piston rings may be composed of steel, while the trunk is made of cast iron or other suitable material, thus materially lightening the piston as a whole and avoiding considerable bulk in the head, heretofore employed.

Another object of the invention is to so construct the piston as to take up the lost motion or play between the trunk and the wall of the cylinder, or cushion the aforesaid shock resulting from forcing the trunk towards the wall.

An example of the invention will now be described with reference to the accompanying drawings, the invention, however, being pointed out and set forth in the claim.

In the said drawings:—

Fig. 1 is an illustration of a piston embodying this invention in a motor cylinder.

Fig. 2 is an enlarged axial sectional view of the piston and the attached connecting rod.

The head of the piston comprises an end 3 and skirt or side wall 4. The trunk of the piston comprises a side wall 5 ordinarily forming a continuation of the wall 4 and projecting a considerable distance below or beyond the place in the head where the piston rings 6 are situated. It is understood, of course, that in internal combustion engine construction it is desirable to leave sufficient clearance between the head and the wall of the cylinder 7, to permit the head to undergo the maximum degree of expansion when heated by the explosion, and consequently, the piston rings at this end of the piston alone bear materially against the wall of the cylinder and are relied on for holding the compression. The trunk of the piston, however, is employed more as a guide for the head and it inevitably comes into contact with the wall of the cylinder, notwithstanding the material degree of play left between it and the wall to allow for expansion and avoid the possibility of seizure, and consequently it is desirable that the trunk be composed of cast iron, this as is well known, being the best wearing material for such use. The head may be and preferably is, according to this invention, composed of steel or other light and strong material, so that it may be made comparatively thin, at both its end 3 and side wall 4, thus avoiding bulk of material which results in excessive and unequal expansion, while providing a structure amply able to withstand the shock of the explosion, and durable enough to carry the piston rings. This head is connected to the cast iron trunk in any suitable way. In order, however, to secure the other advantages of the invention due to cushioning the shock of the explosion against the side walls of the cylinder, while at the same time providing a simple means of attachment between the head and the trunk, the trunk is split or divided on one side from top to bottom, as indicated by the line 8 and the contiguous ends of the two elements are provided with some suitable form of interlocking joints, which is here illustrated as a flange or shoulder 9 formed around the inner face of the upper end of the trunk 5, and a circumferential flange or shoulder 10 formed around the lower end of the head 3, the extreme lower edge of the flange 10, if desired, being beveled as shown at 11 to facilitate its introduction into the split and expansible trunk 5. In practice the trunk 5 is ordinarily made as large or slightly larger than the bore of the cylinder; it is then split from end to end, as indicated by the line 8, so that when compressed it will fit easily within the cylinder, and there will still be sufficient space between the edges along the line 8 to allow it to undergo the maximum degree of expansion which it receives from the heat of the combustion. Consequently, while the trunk 5 will have substantially all of the freedom of a trunk permanently smaller in diameter than the bore of the cylinder, it will nevertheless remain permanently in accurate contact or fit with the wall of the cylinder, and absorb the objectionable shock and prevent the knocking sound heretofore resulting from the lateral thrust of the trunk against the cylinder wall. The division line 8 is preferably formed at an angle to the axis of the piston to avoid gaining or grooving the cylinder, and it is situated, as shown in Fig. I, at the side of the cylinder removed from that against which the lateral thrust of the piston occurs, so that the uncut side of the trunk will receive the thrust, this side being determined by the direction in which the crank shaft rotates, and it being always that side of the crank shaft opposite the direction in which the crank moves immediately after receiving the explosion.

The bearings or supports 12 for the gudgeon pin 13 may be cast or formed on the trunk portion of the piston, but in order that the gudgeon pin may be sufficiently free in the bearing 12 to allow for the expansion and contraction of the aforesaid resilient action of the piston trunk, the connecting rod which is shown at 14 is secured rigidly to the gudgeon pin by any suitable means, such as screw 15.

With a piston trunk thus constructed, it will also be seen that this portion of the piston, as well as the head portion, may be machined both inside and out, thereby providing uniform thicknesses, and avoiding unequal expansion and distortion.

Having thus described my invention, what I claim as new and desire to secure by Letters Patent is:

A piston comprising a head; a unitary cylindrical shell forming a depending trunk for said head; means for loosely and detachably securing the shell to the head whereby the shell may expand or contract without restraint of said head; oppositely disposed wrist pin bearings formed in the shell wall; one-half of the shell as bounded by an axial plane through the wrist pin bearings being solid throughout, and the opposite half of the shell having a symmetrically disposed and single split extending at an angle to the shell axis and cutting both free ends of said shell, the solid half of the shell being on that side of the cylinder which receives the lateral thrust of the piston during the power stroke.

In testimony whereof, I affix my signature.

CHARLES Y. KNIGHT.